(12) United States Patent
Takenaka

(10) Patent No.: US 10,295,025 B2
(45) Date of Patent: May 21, 2019

(54) BELT TRANSMISSION SYSTEM

(71) Applicant: BANDO CHEMICAL INDUSTRIES, LTD., Kobe-shi (JP)

(72) Inventor: Keisuke Takenaka, Kobe (JP)

(73) Assignee: Bando Chemical Industries, Ltd., Kobe-shi, Hyogo (JP)

( * ) Notice: Subject to any disclaimer, the term of this patent is extended or adjusted under 35 U.S.C. 154(b) by 232 days.

(21) Appl. No.: 15/357,792

(22) Filed: Nov. 21, 2016

(65) Prior Publication Data
US 2017/0122414 A1 May 4, 2017

Related U.S. Application Data

(63) Continuation of application No. PCT/JP2015/002468, filed on May 15, 2015.

(30) Foreign Application Priority Data

May 22, 2014 (JP) .................... 2014-106406
Mar. 6, 2015 (JP) .................... 2015-044267

(51) Int. Cl.
*F16H 7/12* (2006.01)
*F02B 67/06* (2006.01)
*F02N 11/04* (2006.01)
*F16H 7/08* (2006.01)

(52) U.S. Cl.
CPC ........... *F16H 7/1263* (2013.01); *F02B 67/06* (2013.01); *F02N 11/04* (2013.01); *F16H 7/12* (2013.01); *F16H 2007/081* (2013.01); *F16H 2007/0806* (2013.01); *F16H 2007/0808* (2013.01); *F16H 2007/0842* (2013.01);
(Continued)

(58) Field of Classification Search
CPC .. F16H 7/1263; F16H 7/12; F16H 2007/0806; F16H 2007/0808; F16H 2007/081; F16H 2007/0842; F16H 2007/0865; F16H 2007/0874; F16H 2007/0893; F02B 67/06; F02N 11/04
See application file for complete search history.

(56) References Cited

U.S. PATENT DOCUMENTS 5,011,460 A 4/1991 Ouchi et al.
2001/0007839 A1 7/2001 Guhr
(Continued)

FOREIGN PATENT DOCUMENTS

DE 10 2008 058969 A1 5/2010
JP S5028299 Y1 8/1975
(Continued)

*Primary Examiner* — Michael R Mansen
*Assistant Examiner* — Robert T Reese
(74) *Attorney, Agent, or Firm* — Knobbe, Martens, Olson & Bear, LLP

(57) ABSTRACT

A belt transmission system comprises: a first pulley; a second pulley; a belt; and an automatic tensioner having a first tension pulley and a second tension pulley applying tension to a portion of the belt located at a tension side and a portion of the belt located at a slack side of the belt, and an arm. Force from the belt makes the first tension pulley and the second tension pulley rotate in the same direction. When the first tension pulley rotates in a direction tensioning the belt, the second tension pulley also rotates in a direction tensioning the belt.

10 Claims, 16 Drawing Sheets

(52) U.S. Cl.
CPC .............. *F16H 2007/0865* (2013.01); *F16H 2007/0874* (2013.01); *F16H 2007/0893* (2013.01)

(56) References Cited

U.S. PATENT DOCUMENTS

| | | | | |
|---|---|---|---|---|
| 2002/0039944 | A1* | 4/2002 | Ali | F16H 7/1209 474/135 |
| 2003/0153420 | A1 | 8/2003 | Rogers | |
| 2003/0153421 | A1* | 8/2003 | Liu | F16H 7/1209 474/134 |
| 2005/0181901 | A1* | 8/2005 | Shin | F16H 7/1218 474/134 |
| 2010/0016106 | A1* | 1/2010 | Minemura | B41J 3/4071 474/113 |
| 2014/0357436 | A1* | 12/2014 | Hara | F16H 7/12 474/113 |
| 2015/0219189 | A1* | 8/2015 | Serkh | F16H 7/1218 474/112 |
| 2017/0037940 | A1* | 2/2017 | Serkh | F16H 7/1281 |
| 2018/0058551 | A1* | 3/2018 | Takahashi | F02B 67/06 |

FOREIGN PATENT DOCUMENTS

| | | | |
|---|---|---|---|
| JP | H02-245553 | A | 10/1990 |
| JP | 2001-193807 | A | 7/2001 |
| JP | 2004-068973 | A | 3/2004 |

\* cited by examiner $$P = 2 \times Tb \times \sin(\theta/2)$$
$$m = L \times \sin(\alpha)$$
$$Tr = P \times m$$
$$Tr = 2 \times Tb \times L \times \sin(\theta/2) \times \sin(\alpha)$$

$L$ : ARM LENGTH (mm)
$Tb$ : BELT TENSION (N)
$\theta$ : WRAP ANGLE (DEGREES)
$\alpha$ : HUB LOAD ANGLE (DEGREES)
$P$ : HUB LOAD
$m$ : MOMENT ARM LENGTH $$Tr = 2 \times Tb \times \left[L_1 \times \sin\left(\theta_1/2\right) \times \sin(\alpha_1) + L_2 \times \sin\left(\theta_2/2\right) \times \sin(\alpha_2)\right]$$

BELT TRANSMISSION SYSTEM

CROSS-REFERENCE TO RELATED APPLICATION

This application claims priority to Japanese Patent Application No. 2014-106406 filed on May 22, 2014, the entire disclosure of which is incorporated by reference herein.

BACKGROUND

The present disclosure relates to a belt transmission system.

Some belt transmission systems having an internal combustion engine, a generator and a starter motor include two automatic tensioners (hereinafter abbreviated as AT). Among the two ATs, in particular the AT located between a crankshaft pulley and the generator is required to have a high damping property when the generator and the starter motor start operating. Therefore, hydraulic ATs are being increasingly employed in belt transmission systems.

SUMMARY

However, hydraulic ATs are relatively expensive in comparison to other kinds of ATs. In belt transmission systems employing two ATs, another AT is necessary. This results in increased production costs.

On the other hand, when the generator and the starter motor start operating or during normal use, the belt may slip leading to start problems and abnormal noise.

By contrast, Japanese Unexamined Patent Publication No. 2001-193807 describes a belt transmission system having an internal combustion engine and a generator/starter motor. The reference discloses a configuration where a first and a second tension roller (pulley) R1, R2 are provided one each on a slack side and on a tension side of a pulley of the generator/starter motor. In this belt transmission system, the tension rollers R1, R2 turn into opposite directions. Further, a spring is provided for applying tension required by one of the tension rollers.

According to this configuration, a generated torque required by the spring can be reduced. However, the tension which can be generated (spring force and damping capacity) is low, which is why the oscillation of an arm increases and slippage and abnormal noise may occur easily. Further, endurance-related problems occur when the oscillation of the arm increases.

US Patent Application Publication No. 2003/0153420 discloses an automatic tensioner comprising two pivotally arranged arms, each arm coupled to a tension pulley. However, if one tension pulley is arranged on a tension side of a belt of an AGS pulley and the other one on a slack side of the belt of the AGS pulley, one tension pulley rotates in a direction tensioning the belt so that the other one rotates in a direction slackening the belt. Therefore, following the art described in US Patent Application Publication No. 2003/0153420, it would be difficult to obtain a high damping capacity and to suppress the oscillation of the arm effectively.

Japanese Unexamined Patent Publication No. 2004-068973 discloses an automatic tensioner comprising a shaft in the shape of a round bar located at a pivot position, this shaft supporting a first and a second arm in a manner capable of oscillating. In this automatic tensioner, a layout maintaining a hub load angle of 170° or less is employed, by means of which the tension of the belt can be prevented from falling below 0, and slippages of the belt and the occurrence of abnormal noise can be reduced. However, this automatic tensioner does not aim to reduce the oscillation of the arm and to prolong the lifespan of the system.

Note that obtaining a high damping capacity and reducing the oscillation of the arm is of importance not only for a belt transmission system including a crankshaft pulley and a generator/starter pulley, but also for an automatic tensioner used in a system for transmitting any kind of power.

In the belt transmission system disclosed herein, where a crankshaft pulley and a generator/starter pulley etc. are configured to serve as a drive pulley and a driven pulley in an interchangeable manner, durability may be improved by reducing the oscillation of the arm, while the occurrence of slippages and abnormal noise may be reduced.

A belt transmission system according to an embodiment of the present disclosure comprises a first pulley transmitting a first power, a second pulley transmitting a second power, an endless belt wrapped between the first pulley and the second pulley, and an automatic tensioner including a first tension pulley, a second tension pulley, a fixed member, and an arm. The first tension pulley applies tension to a portion of the belt located between the first pulley and the second pulley on a slack side of the first pulley during normal operation. The second tension pulley applies tension to a portion of the belt located between the first pulley and the second pulley on a tension side of the first pulley during normal operation. The arm is provided on the fixed member in an axial rotation direction of the fixed member in a manner capable of oscillating. Moreover, the first tension pulley and the second tension pulley are both supported by the arm. The direction the first tension pulley rotates in driven by the force from the belt is the same as the direction the second pulley rotates in driven by the force from the belt. Further, when the first tension pulley rotates in a direction tensioning the belt, also the second tension pulley may rotate in a direction tensioning the belt.

A belt transmission system according to an embodiment of the present disclosure may reduce slippages, arm oscillation, and abnormal noise.

Figure 1:
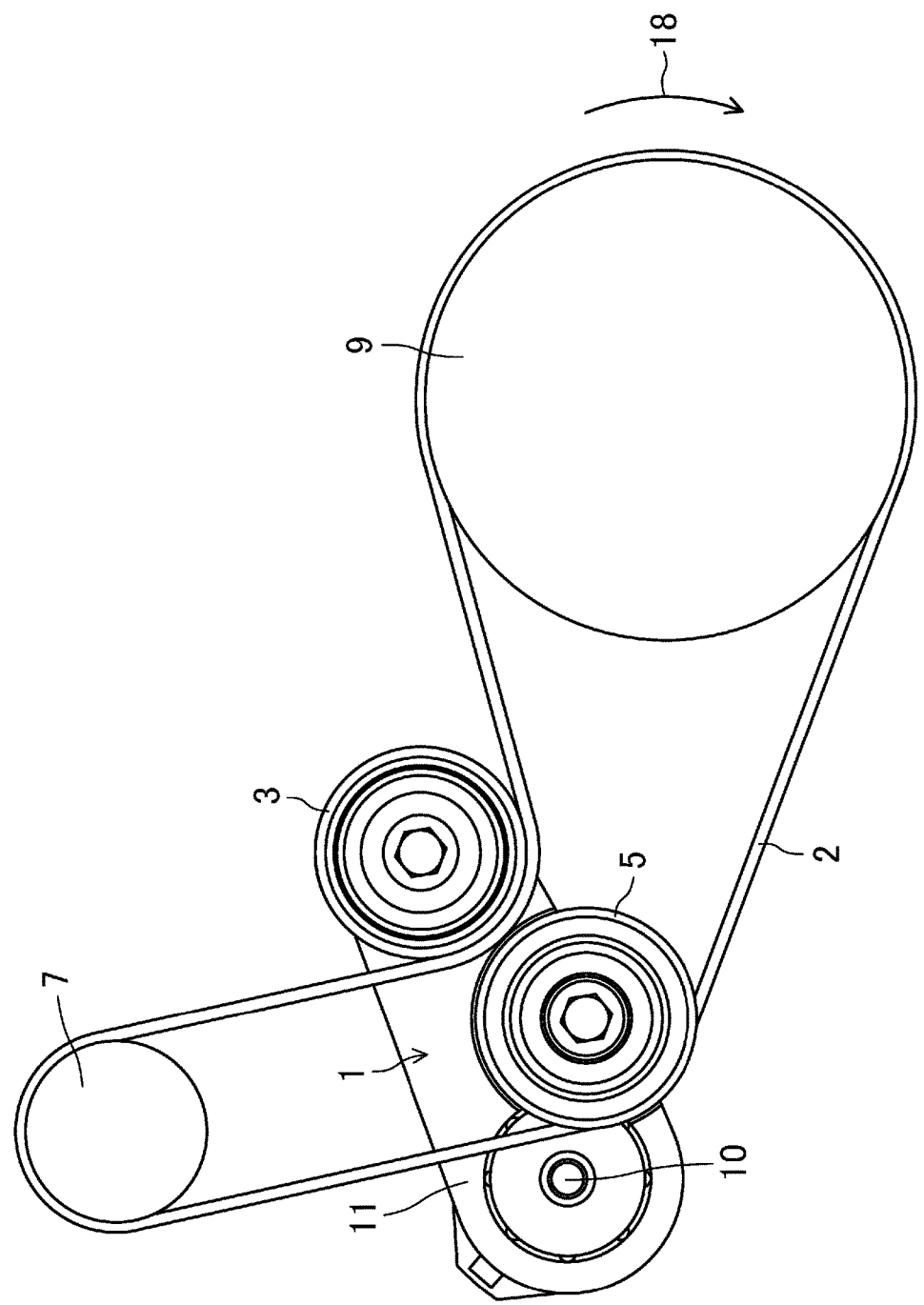
FIG. 1 schematically illustrates a configuration of a belt transmission system including an automatic tensioner of the present disclosure.
Figure 2:
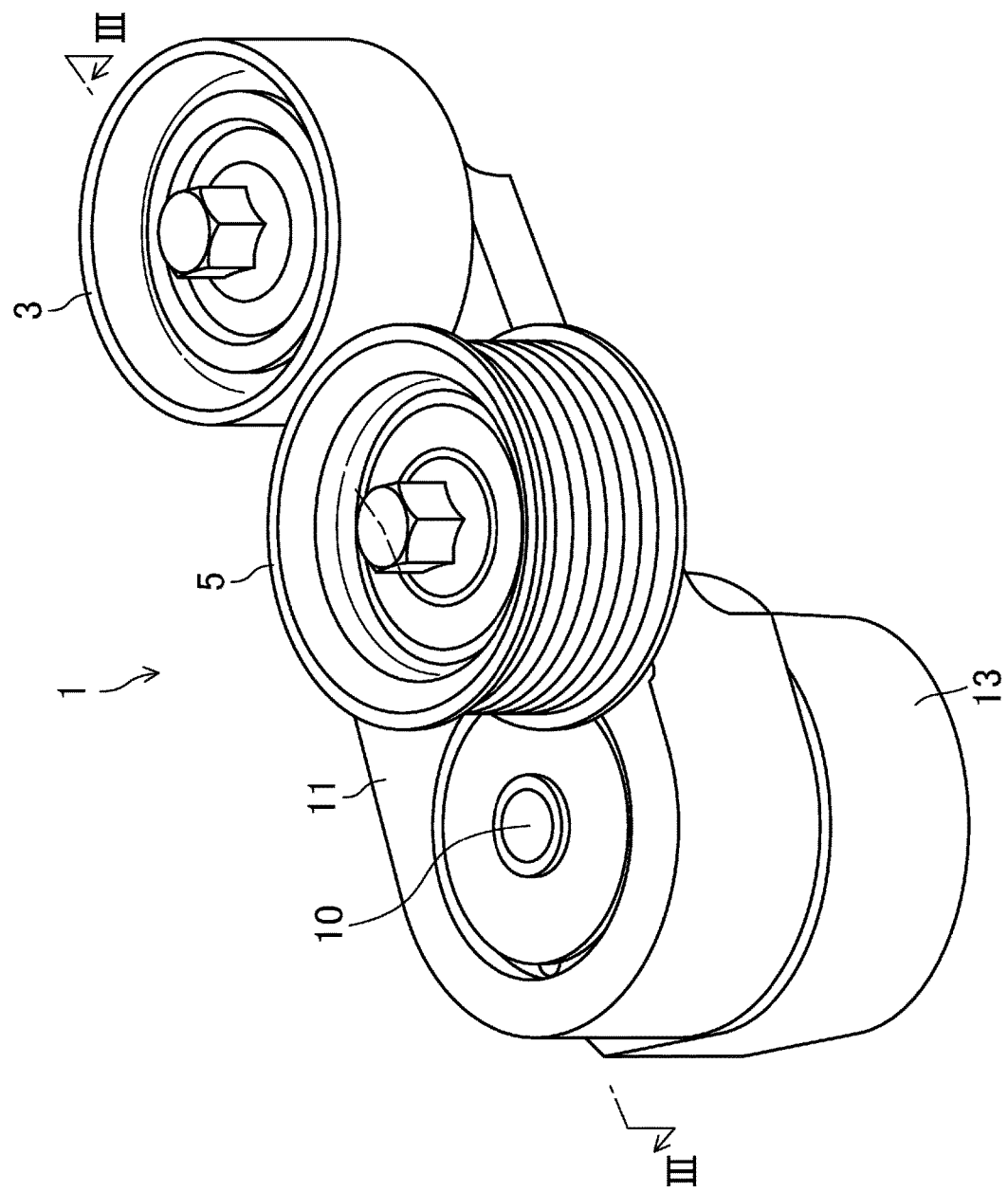
FIG. 2 is a perspective view showing the automatic tensioner of the present disclosure.
Figure 3:
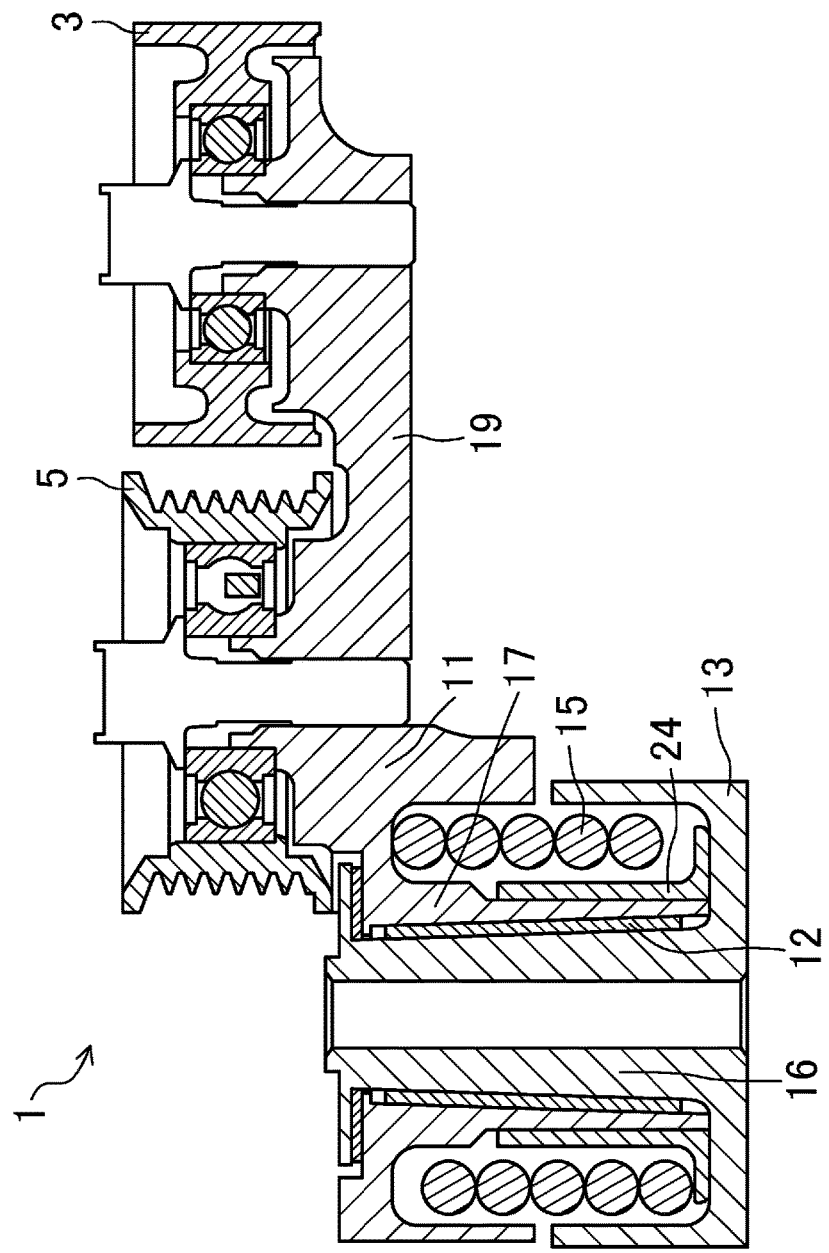
FIG. 3 is a cross-sectional view along line III-III drawn in FIG. 2 (see FIG. 2) of the automatic tensioner of the present disclosure.
Figure 4:
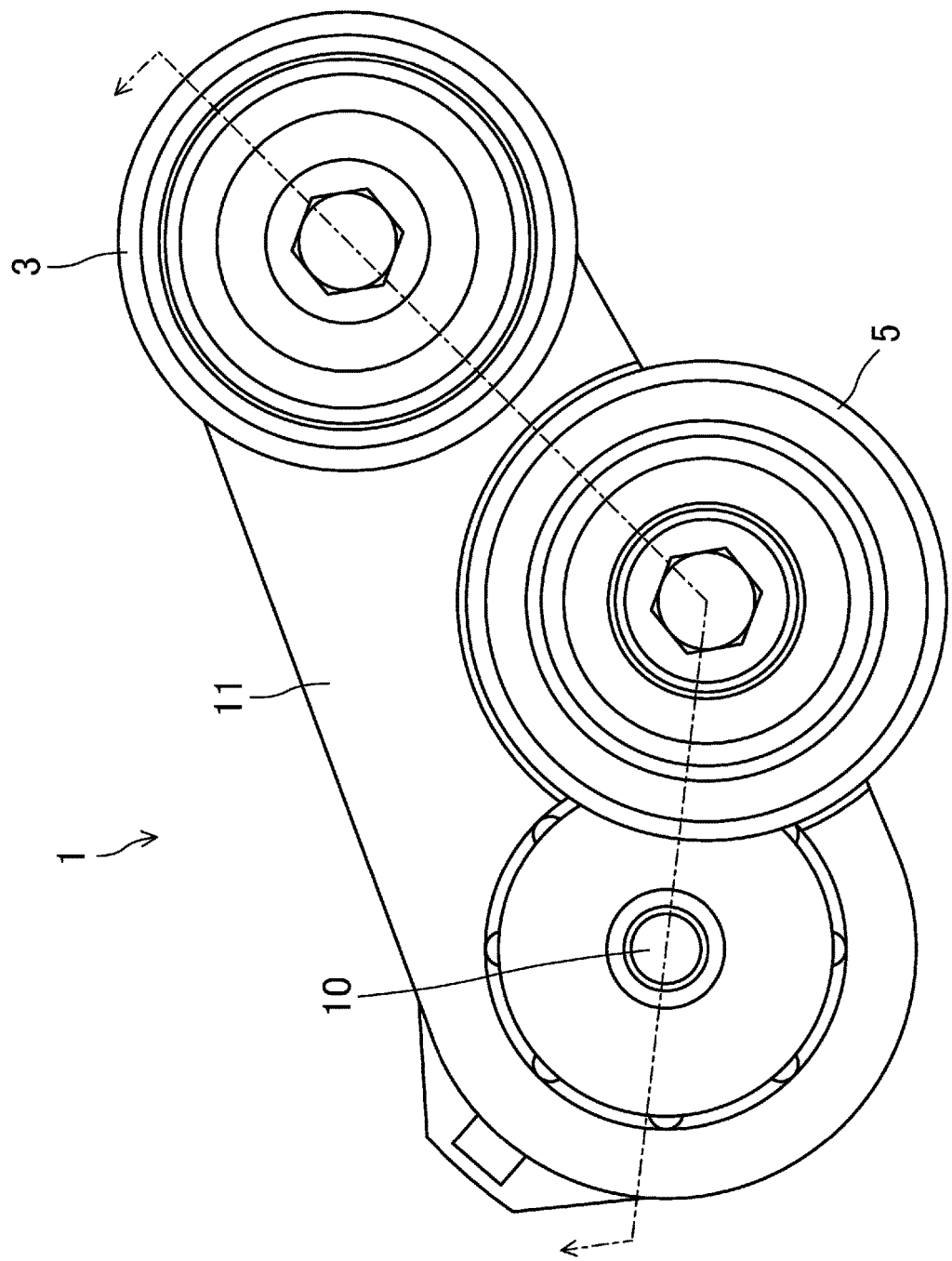
FIG. 4 is a top view of the automatic tensioner of the present disclosure (when viewed from a tension pulley side).
Figure 5:
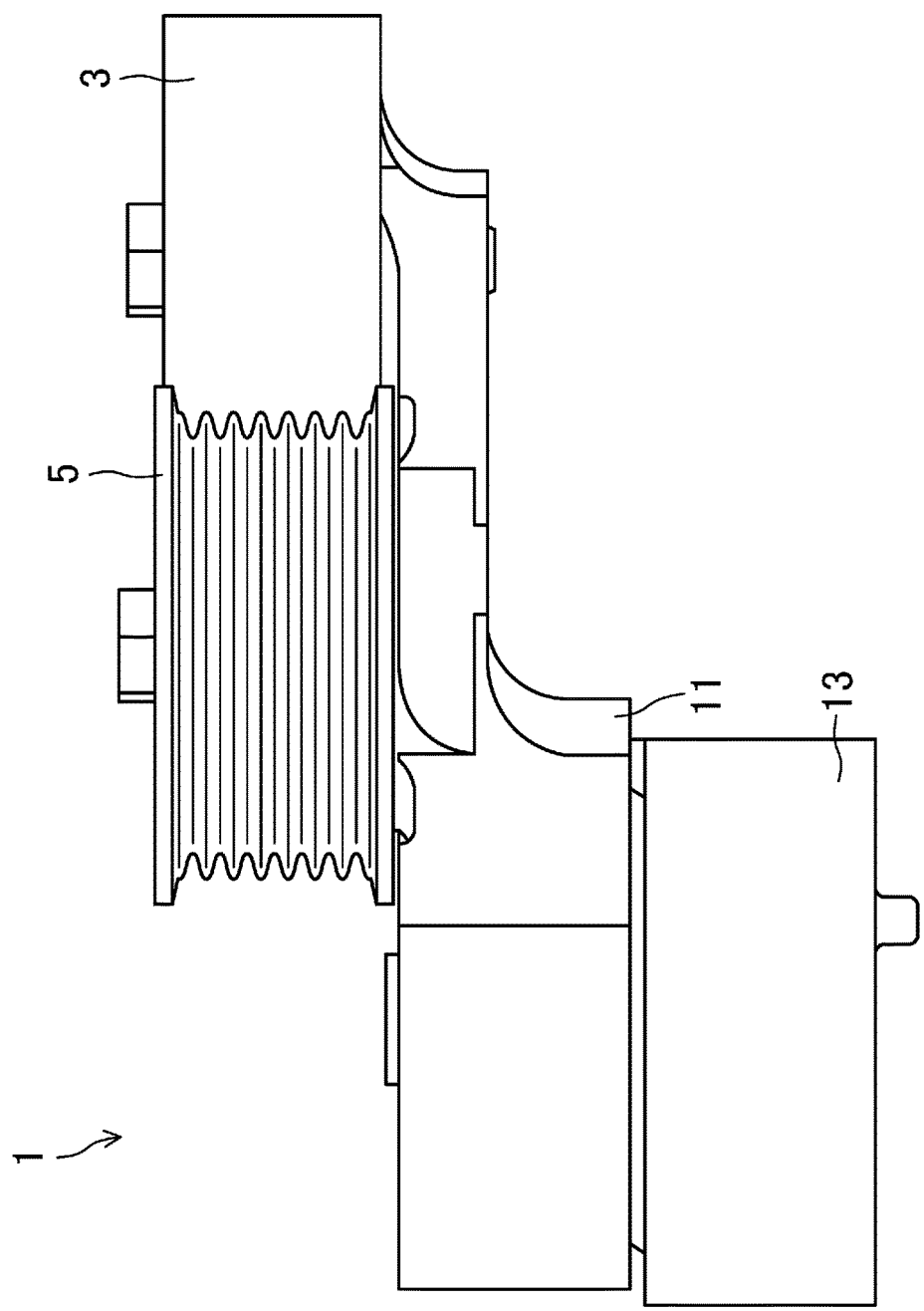
FIG. 5 is a side view of the automatic tensioner of the present disclosure.

DETAILED DESCRIPTION (Embodiment)
—Configuration of Automatic Tensioner—
FIG. 1 shows a belt transmission system comprising an automatic tensioner 1 according to an embodiment of the present disclosure. FIG. 2 is a perspective view of the automatic tensioner 1 in the belt transmission system according to this embodiment. FIG. 3 is a cross-sectional view of the automatic tensioner 1 along line III-III shown in FIG. 2. FIG. 4 is a top view of the automatic tensioner 1 according to this embodiment viewed from a tension pulley side. FIG. 5 is a side view of the automatic tensioner 1 according to this embodiment.

As shown in FIG. 1, the belt transmission system according to this embodiment transmits power generated at, for example, an internal combustion engine and a generator/starter motor. Here, the term "generator/starter motor" refers to an apparatus combining a generator and a starter motor into one. The belt transmission system comprises: a crankshaft pulley (first pulley) 9 transmitting power generated at the internal combustion engine; a generator/starter pulley (second pulley) 7 transmitting power generated at the generator/starter motor; an endless belt 2 wrapped between the crankshaft pulley 9 and the generator/starter pulley 7; and the automatic tensioner 1 applying a predetermined tension to the belt 2.

The configuration for applying tension to the belt 2, and the configuration for providing the automatic tensioner 1 with a damping property have no particular limitation. However, here, an automatic tensioner 1 provided with a torsion coil spring will be exemplified.

As shown in FIGS. 2-5, the automatic tensioner 1 includes: a fixed member 13 fixed on, for example, an automotive engine and having a tubular portion; an arm 11 provided on the fixed member 13 in a manner capable of oscillating in an axial rotation direction of the fixed member 13; and a first tension pulley 5 and a second tension pulley 3 both supported and fixed on the arm 11. The first tension pulley 5, in comparison to the second tension pulley 3, is closer to an oscillation center (pivot) 10 of the arm 11. However, as stated below, the configuration is not limited to this.

The second tension pulley 3 applies tension to a portion of the belt 2 located between a crankshaft pulley 9 and the generator/starter pulley 7 and at a tension side of the crankshaft pulley 9 during normal operation. The first tension pulley 5 applies tension to a portion of the belt 2 located between a crankshaft pulley 9 and the generator/starter pulley 7 and at the slack side of the crankshaft pulley 9 during normal operation. By means of this configuration, the tension of the belt 2 is adjusted within an adequate range.

There is no particular limitation regarding a support method of the fixed member 13 of the arm 11. For example, both parts may be provided with a tubular portion of different diameters so that the tubular portions fit into each other.

In the examples shown in FIG. 2-5, the arm includes a tubular axis portion 17 fitted into a tubular portion (spindle) 16 of the fixed member 13, and an extension portion 19 extending in a horizontal direction (vertically with respect to an axis direction of the axis portion 17 and the fixed member 13) from the axis portion 17. The first tension pulley 5 and the second tension pulley 3 are each fixed to the extension portion 19 by means of a fixing tool such as a nut or a screw.

In an automatic tensioner 1, a bush 12 is provided between, for example, the tubular portion 16 of the fixed member 13 and the axis portion 17 of the arm 11 fitted to the tubular portion 16. A lateral face of the tubular portion 16 of the fixed member 13 and of the axis portion 17 is provided with a torsion coil spring 15, one end of which is latched (connected) to the arm 11, and the other end of which is latched (connected) to the fixing member 13. The torsion coil spring 15 has an axis roughly corresponding to the axis of the axis portion 17 and can apply tension to the belt 2 via the first tension pulley 5 and the second tension pulley 3 by driving the arm 11 in an oscillation direction of the arm. Beneficially, the torsion coil spring 15 is made up of a metal like, for example, silicon chromium copper or of a metallic compound.

The belt 2 may be a flat belt, but may also be a toothed belt, a cogged belt, a V-belt or a different kind of belt. There is no particular limitation regarding a surface of the belt 2 in contact with the first tension pulley 5 and the second tension pulley 3. For example, if the belt 2 is a flat belt or a toothed belt, the first tension pulley 5 may be in contact with an outer surface or an inner surface of the belt 2, and the second tension pulley 3 may be in contact with the other face among the outer surface or the inner surface of the belt 2 than the first tension pulley 5. Alternatively, the first tension pulley 5 and the second tension pulley 3 may be in contact with a side surface of the belt 2.

The fixed member 13 is fixed to, for example, an engine body by means of a fixing tool, such as a bolt. The fixing member 13 and the arm 11 are composed of a known metal, and may be formed using a die.

In the automatic tensioner 1 of the embodiment, force from the belt 2 makes the first tension pulley 5 and the second tension pulley 3 rotate in the same direction.

Further, when the first tension pulley 5 rotates in a direction tensioning the belt 2, the second tension pulley 3 also rotates in a direction tensioning the belt 2. Contrariwise, when the first tension pulley 5 rotates in a direction slackening the belt 2, the second tension pulley 3 also rotates in a direction slackening the belt 2.

In the automatic tensioner 1 of the present embodiment, when an engine starts up and is driven (during normal operation), the crankshaft pulley 9 is driven and the belt 2 rotates, for example, clockwise. Thereby, a portion of the belt in contact with the first tension pulley 5 becomes the slack side of the belt, while a portion of the belt in contact with the second tension pulley 3 becomes the tension side of the belt. At this time, the driving force of the torsion coil spring 15 of the automatic tensioner 1 is applied to the tension side of the belt mainly via the second tension pulley 3. In contrast, on the slack side of the belt, the driving force of the torsion coil spring 15 applied to the belt 2 is small in comparison to that on the tension side of the belt.

Further, when the generator/starter motor starts up and is driven, the generator/starter pulley 7 is driven, and the belt 2 rotates clockwise. In this case, the portion of the belt 2 in contact with the first tension pulley 5 becomes the tension side of the belt, and the portion in contact with the second tension pulley 3 becomes the slack side of the belt. At this time, the drive force of the torsion coil spring 15 of the automatic tensioner 1 is applied to the tension side of the belt mainly via the first tension pulley 5.

As described above, in the belt transmission system of the present embodiment, the driving force of the torsion coil spring 15 included in the automatic tensioner 1 may be distributed in a balanced manner between the tension side of the belt and the slack side of the belt in accordance with the condition of a belt transmission system. Thus, in comparison to known belt transmission systems, the oscillation of the arm 11 can be reduced by a great extent, and belt slippages may be prevented effectively.

Further, in the belt transmission system of the present embodiment, when the portion of the belt in contact with the first tension pulley 5 is the slack side of the belt and the portion of the belt in contact with the second tension pulley 3 is the tension side of the belt, the driving force of the torsion coil spring 15 of the automatic tensioner 1 applied to the tension side of the belt via the second tension pulley 3 increases, while the driving force of the torsion coil spring 15 of the automatic tensioner 1 applied to the slack side of the belt via the first tension pulley 5 decreases.

When the portion of the belt in contact with the first tension pulley 5 is the tension side of the belt and the portion of the belt in contact with the second tension pulley 3 is the slack side of the belt, the driving force of the torsion coil spring 15 of the automatic tensioner 1 applied to the tension side of the belt via the first tension pulley 5 increases, while the driving force of the torsion coil spring 15 of the automatic tensioner 1 applied to the slack side of the belt via the second tension pulley 3 decreases.

Thus, the belt transmission system, in which a drive pulley and driven pulley are configured to be interchanged, may change the proportion of the driving force generated by the torsion coil spring 15 of the automatic tensioner 1 and applied to the tension side of the belt and to the slack side of the belt. Hence, the belt transmission system may adjust the tension of the belt 2. Thus, the oscillation of the arm 11 may be reduced by a great extent.

Therefore, with the belt transmission system of the present embodiment, not only may abnormal noise occurring along with belt slippages be reduced, but also the durability of the automatic tensioner 1 may be improved. Moreover, the oscillation range of the arm 11 may be reduced, which is why mounting this automatic tensioner onto, for instance, a car body is simplified in comparison to known automatic tensioners.

The automatic tensioner 1 of the present embodiment can be manufactured by combining conventionally known members. Moreover, there is no need for altering the design of the belt 2, the generator/starter pulley 7, the crankshaft pulley 9, or another member. Consequently, the belt transmission system of the present embodiment may be introduced at low cost.

Further, it is beneficial if the automatic tensioner 1 is provided with a member for imparting a one-directional damping property to the tensioner. Damping capacity can be obtained from friction of a slide member and the arm 11 or the fixed member 13. However, in the example shown in FIG. 3, for instance, a sliding member 24 comprised of, for example, a resin and sliding in a part of the arm 11 is provided at an inside and an underside the torsion coil spring 15.

If the tension of the belt 2 being in contact with the first tension pulley 5 and the second tension pulley 3 decreases, a torsional torque in a direction toward which the diameter of the torsion coil spring 15 increases makes the arm 11 rotate in a direction the belt 2 is pushed. By contrast, if the tension of the belt 2 increases, the first tension pulley 5 and the second tension pulley 3 are pressurized by an opposing force of the belt, and the arm 11 rotates in a direction opposite to a pushing direction of the belt, and thus the belt tension is prevented from increasing.

Herein, a part of the torsion coil spring 15 is constantly pressurized in a circumferential direction by an opposing force of the torsional torque of the torsion coil spring 15. When an arm 11 rotates in a pressing direction of the belt, i.e., when the diameter of torsion coil spring 15 increases, the opposing force of the torsional torque decreases correspondingly. Thus the damping capacity decreases. Consequently, the rotation of the arm 11 occurs quickly. By contrast, when the arm 11 rotates in the direction opposite to the pressing direction of the belt, i.e., when the diameter of the torsion coil spring 15 decreases, the opposing force of the torsional torque increases correspondingly, and thus the damping capacity increases.

In this, by providing a member imparting a one-directional damping property to the automatic tensioner 1, the oscillation of the arm 11 may be diminished. Further, thanks to this configuration, the dynamic tension applied to the belt 2 may be increased.

Note that if the tension side and the slack side of the generator/starter pulley 7 are each provided with an automatic tensioner including only one tension pulley, a space where the automatic tensioner is installed is limited, which is one reason why the layout is strongly limited. By contrast, in the automatic tensioner 1 of the present embodiment, one arm 11 is provided with the first tension pulley 5 and the second tension pulley 3, which is why the automatic tensioner 1 may be designed flexibly to large degree.

—T/S Ratio Optimization—

Figure 6:
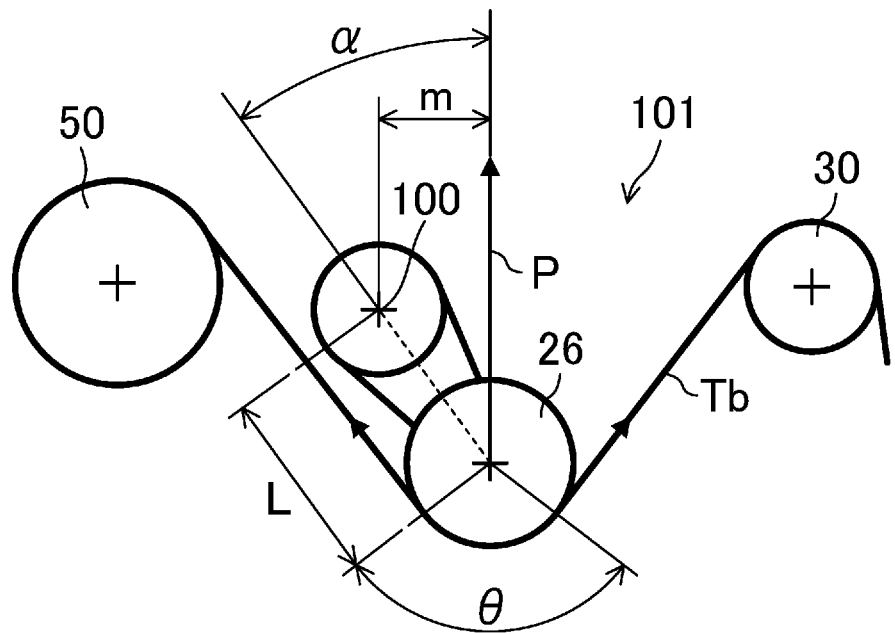
FIG. 6 explains various kinds of force acting when a conventional automatic tensioner is employed in a belt transmission system.
Figure 7A:
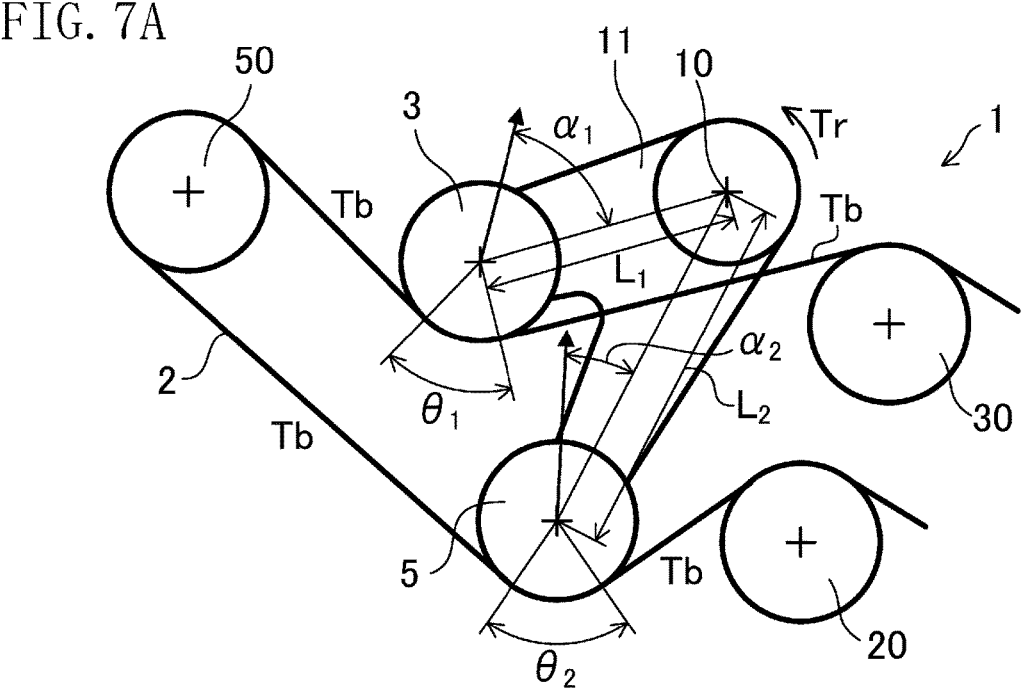
FIG. 7A explains various kinds of force acting during a static state when an automatic tensioner according to an embodiment is employed in a belt transmission system.
Figure 7B:
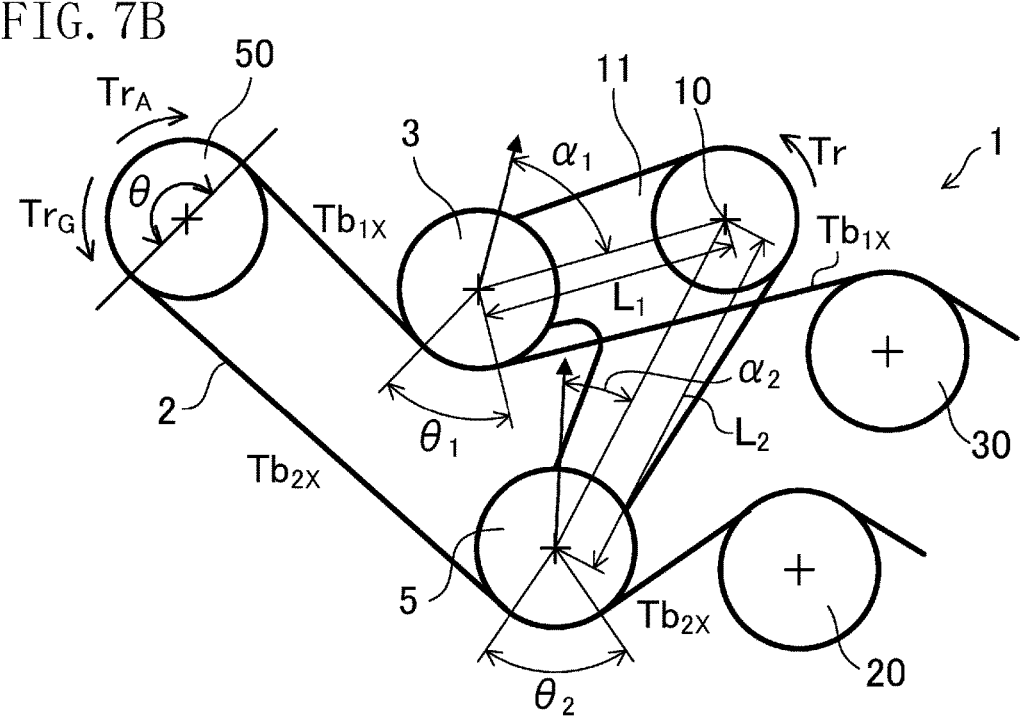
FIG. 7B explains various kinds of force acting during an operating state when the automatic tensioner according to the embodiment is employed in a belt transmission system.

FIG. 6 explains various kinds of force acting when a conventional automatic tensioner is employed in a belt transmission system. FIGS. 7A and 7B respectively explain various kinds of force acting during a static state and an operating state when an automatic tensioner according to the present embodiment is employed in a belt transmission system.

The automatic tensioner 1 of the present embodiment is provided with the two tension pulleys 3 and 5. Therefore, a torque distribution ratio of an arm portion in contact with the first tension pulley 5 (in the example shown in FIG. 1, a portion of the arm 11 extending from the oscillation center (pivot) 10 to the center of the second tension pulley 3) and an arm portion in contact with the second tension pulley 3 (in the example shown in FIG. 1, a portion of the arm 11 extending from the oscillation center 10 to the center of the second tension pulley 3), i.e., a T/S ratio, may be modified appropriately. By modifying the T/S ratio, a tension response with respect to a torque may be changed, and the relationship shown in the torque-span tension graph (FIG. 8, which will be described later) may be altered.

As explained above, in the belt transmission system of the present embodiment, the two tension pulleys 3 and 5 provided for one automatic tensioner 1 apply tension to the tension side and to the slack side of the belt 2, while force from the belt 2 makes the first tension pulley 5 and the second tension pulley 3 rotate in the same direction. Moreover, if the first tension pulley 5 rotates in a direction tensioning the belt 2, the second tension pulley 3 also rotates in a direction tensioning the belt 2. Thanks to this configuration, the automatic tensioner 1 of the present embodiment may be easily optimized in design, as explained below. While reducing excess tension applied to the belt, force acting on an axis of a drive pulley or a driven pulley mounted to the automatic tensioner 1 may be reduced by a great extent.

As shown in FIG. 6, if a conventional automatic tensioner 101 provided with only one tension pulley 26 is installed between two pulleys 30 and 50, the following equations can be formulated.

Hub Load $P=2 \times Tb \times \sin(\theta/2)$

Moment Arm Length $m = L \times \sin(\alpha)$ $Tr = P \times m = 2 \times Tb \times L \times \sin(\theta/2) \times \sin(\alpha)$ In the above equations, L is an arm length (mm) from an arm oscillation center 100 to a center position of the tension pulley 26, and Tb is a tension (N) of the belt 2 (i) between the tension pulley 26 and the pulley 30, and (ii) between the tension pulley 50 and the pulley 26. Further, θ is a wrap angle of the belt 2 at the tension pulley 26, and α is an angle defined by an input line from the belt 2 to the tension pulley 26 and the arm oscillation center 100 and a line connecting the arm oscillation center 100 and the center of the tension pulley 26. Tr is a torque generated at the arm oscillation center 100.

By contrast, as shown in FIG. 7A, if the first tension pulley 5 of the automatic tensioner 1 of the present embodiment is installed between the pulley 50 and the pulley 20, and the second tension pulley 3 is installed between the pulley 50 and the pulley 30, a torque Tr generated at the oscillation center of the arm 11 during a static state of the belt transmission system is described by the equation (1) given below.

$$Tr = 2 \times Tb \times [L_1 \times \sin(\theta_1/2) \times \sin(\alpha_1) + L_2 \times \sin(\theta_2/2) \times \sin(\alpha_2)] \quad (1)$$

Further, as shown in FIG. 7B, when a belt transmission system having the automatic tensioner 1 of the present embodiment installed is allowed to operate, if the belt 2 rotates clockwise, a clockwise torque (reverse torque) $Tr_A$ is generated at the pulley 50 when this pulley 50 serves as a drive pulley. Further, an anticlockwise torque (normal torque) $Tr_G$ is generated if the pulley 50 serves as a driven pulley. If the pulley 50 is the generator/starter pulley 7, then $Tr_A > Tr_G$. This is because, in a general generator/starter system of an internal combustion engine, the highest torque is generated at the generator/starter pulley 7 when a starter starts up.

At this time, when $Tr_A$ is a maximum value, a value $Tb_{1A}$ (required tension) of a belt tension $Tb_1$ between the pulley 50 and the second tension pulley 3, and a value $Tb_{2A}$ of a belt tension $Tb_2$ between the pulley 50 and the first tension pulley 5 are calculated. Further, when $Tr_G$ is a maximum value, a value $Tb_{1G}$ of the belt tension $Tb_1$ between the pulley 50 and the second tension pulley 3, and a value $Tb_{2G}$ (required tension) of the belt tension $Tb_2$ between the pulley 50 and the first tension pulley 5 are calculated. In this, $Tr_A$ and $Tr_G$ are values required when actually designing a layout.

In calculating the required tension for each case, Euler's formula $Tt/Ts \leq e^{\mu'\theta}$ may be applied. In this, Tt is a tension side tension of the belt 2, Ts is a slack side tension of the belt 2, μ' is an apparent frictional coefficient between the belt 2 and the pulley 50, and θ is a belt wrap angle at the pulley 50.

Specifically, the slack side tension Ts is calculated using Euler's formula, and the tension side tension Tt is calculated by adding an effective tension to Ts.

$$Tr_A : Tb_{2A}/Tb_{1A} = e^{\mu'\theta} \quad (2)$$

$$Tb_{2A} = Tb_{1A} + Tr_A/R \quad (3)$$

Herein, R is a radius of the pulley 50.

The required belt tension $Tb_{1A}$ between the pulley 50 and the second tension pulley 3 is determined by equation (4).

$$Tb_{1A} = Tr_A/R(e^{\mu'\theta} - 1) \quad (4)$$

$$Tr_G : Tb_{1G}/Tb_{2G} = e^{\mu'\theta} \quad (5)$$

$$Tb_{1G} = Tb_{2G} + Tr_G/R \quad (6)$$

The required belt tension $Tb_{2G}$ between the pulley 50 and the first tension pulley 5 is determined by equation (7).

Note that, if necessary, a dynamic analysis may be conducted to determine a range in which no slippage of the belt 2 occurs.

Next, as shown in TABLE 1, a ratio of an absolute value of $Tb_{1A}-Tb_{1G}$ ($\Delta Tb_1$) and an absolute value of $Tb_{2A}-Tb_{2G}$ ($=\Delta Tb_2$), i.e., the T/S ratio ($=\Delta Tb_2/\Delta Tb_1$, simply denoted as "T/S" in FIG. 8), is determined. Using the above method, the optimal T/S ratio value may be determined. In this, a value in which, among the absolute value of $Tb_{2A}$ $Tb_{2G}$ and the absolute value of $Tb_{1A}-Tb_{1G}$, the bigger value is the numerator and the smaller value the denominator may be defined as the optimal value of the T/S ratio.

TABLE 1

| | Required Tension $Tr_A$ | Required Tension $Tr_G$ | $\Delta Tb_x = |Tb_{xA} - Tb_{xG}|$ | T/S Ratio |
|---|---|---|---|---|
| $Tb_1$ | $Tb_{1A}$ | $Tb_{1G}$ | $\Delta Tb_1$ | $\Delta Tb_2/\Delta Tb_1$ |
| $Tb_2$ | $Tb_{2A}$ | $Tb_{2G}$ | $\Delta Tb_2$ | |

Note that, if there is a plurality of drive pulleys and driven pulleys, in calculating the required tension, the required tensions of all pulleys may be calculated and among these values the highest tension may be used as the required tension for determining the T/S ratio. By this, a slippage of the belt 2 and abnormal noise may be prevented effectively at all pulleys.

For instance, in the examples shown in FIGS. 7A and 7B, first, the tension side tension Tt and the slack side tension Ts of the belt 2 with respect to the pulley 20 and 30 are determined using Euler's formula in the same way as those with respect to the pulley 50. Next, the slack side tensions, when the normal torque and the reverse torque generated at pulley 20 and 30 each have a maximum value, are calculated as required tensions.

Subsequently, the most appropriate T/S ratio is calculated using the highest required tension values among the required tensions calculated for each pulley, for a case in which the normal torque has a maximum value and for a case in which the reverse torque has a maximum value respectively.

When $Tr_A > Tr_G$, the T/S ratio described above is determined by equation (8) given below.

$$T/S \text{ ratio} = \{L_1 \times \sin(\theta_1/2) \times \sin(\alpha_1)\}/\{L_2 \times \sin(\theta_2/2) \times \sin(\alpha_2)\} \quad (8)$$

In equation (8), $L_1$ is an arm length (first arm length) from the oscillation center 10 of the arm 11 to a center location of the second tension pulley 3, $\theta_1$ is a belt wrap angle at the second tension pulley 3, and $\alpha_1$ is a hub load angle at the second tension pulley 3. Further, $L_2$ is an arm length (second arm length) from the oscillation center 10 of the arm 11 to the center location of the first tension pulley 5, $\theta_2$ is a belt wrap angle at the first tension pulley 5, and $\alpha_2$ is a hub load angle at the first tension pulley 5.

As shown in equation (8), the T/S ratio is determined by the variables $L_1$, $\theta_1$, $\alpha_1$, $L_2$, $\theta_2$, and $\alpha_2$. Thus, by designing a belt transmission system including the automatic tensioner 1 so that the T/S ratio is close to the optimal value determined before, the excess tension applied to the belt 2 may be reduced.

The present inventor has actually calculated the optimal T/S ratio for a belt transmission system having a belt wrapped between the pulley (driven pulley) 50 and a drive pulley.

Figure 8:
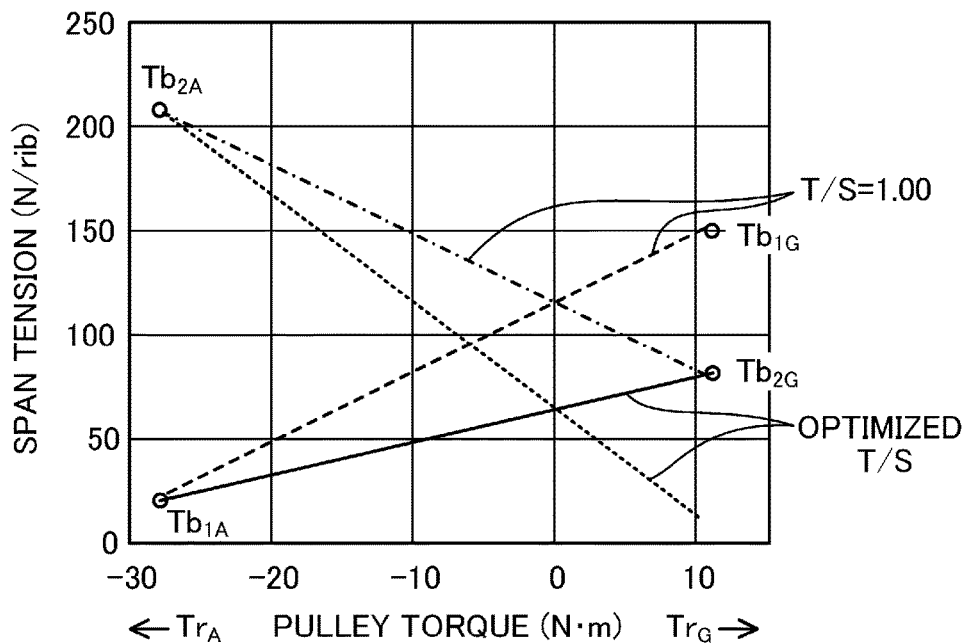
FIG. 8 shows the relationship between a belt tension (span tension) around the belt ribs, when a T/S ratio is optimized and the T/S ratio is 1.00, and a torque generated at a pulley in a belt transmission system of the layout shown in FIG. 7B.
Figure 9:
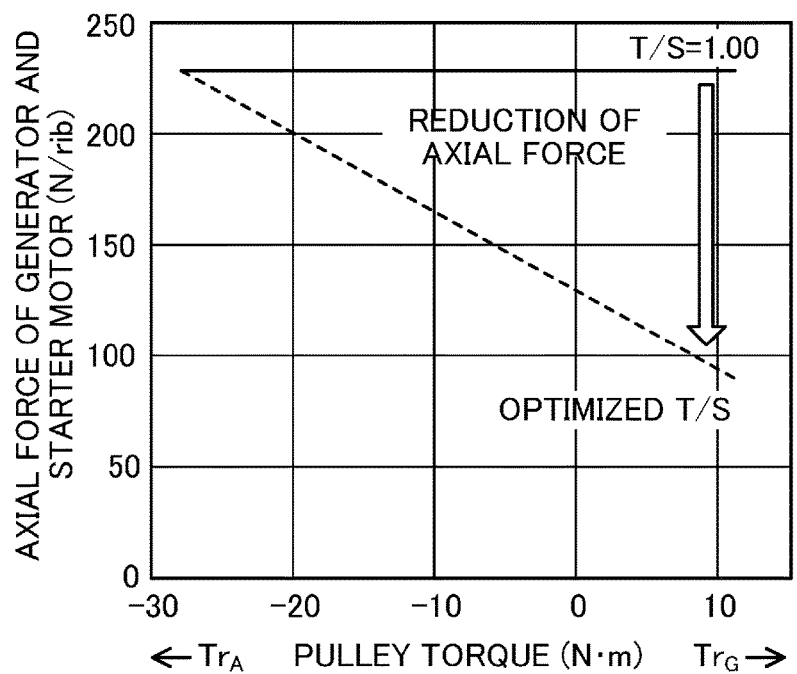
FIG. 9 shows, in a pulley 50, the relationship between the sum of tensions occurring at a tension side and a slack side of the belt around the belt ribs and a torque generated at the pulley 50.

FIG. 8 shows a relationship of a belt tension (span tension) near a belt rib and a torque generated at the pulley 50 in the belt transmission system of the layout shown in TABLE 2 and FIGS. 11A and 11B, which will be described below, for a case in which the T/S ratio is optimized and for a case in which the T/S ratio is 1.00. FIG. 9 shows the relationship of the sum value of the tension side tension and the slack side tension of the belt near the belt rib (i.e., the axial force of the generator and starter motor) at the pulley 50 and the torque generated at the pulley 50. Further, TABLE 2 shows the layout of the belt transmission system and the calculation results of the required tension and the T/S ratio. In FIGS. 8 and 9, theoretical values (optimal values) calculated under the conditions depicted in TABLE 2 are shown.

Figure 10A:
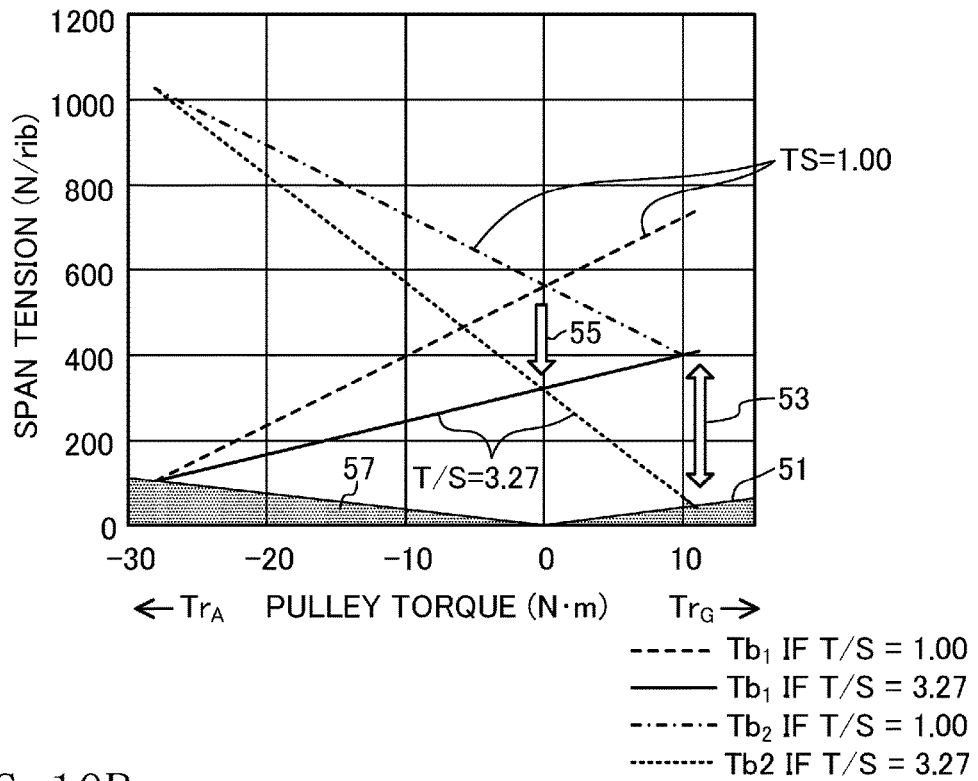
FIG. 10A shows simulation results of a relationship of a belt tension $Tb_1$ between the pulley 50 and a second tension pulley 3 and a belt tension $Tb_2$ between the pulley 50 and a first tension pulley 5 and a torque generated at the pulley 50, when the T/S ratio is 1.00 and 3.27 respectively.
Figure 10B:
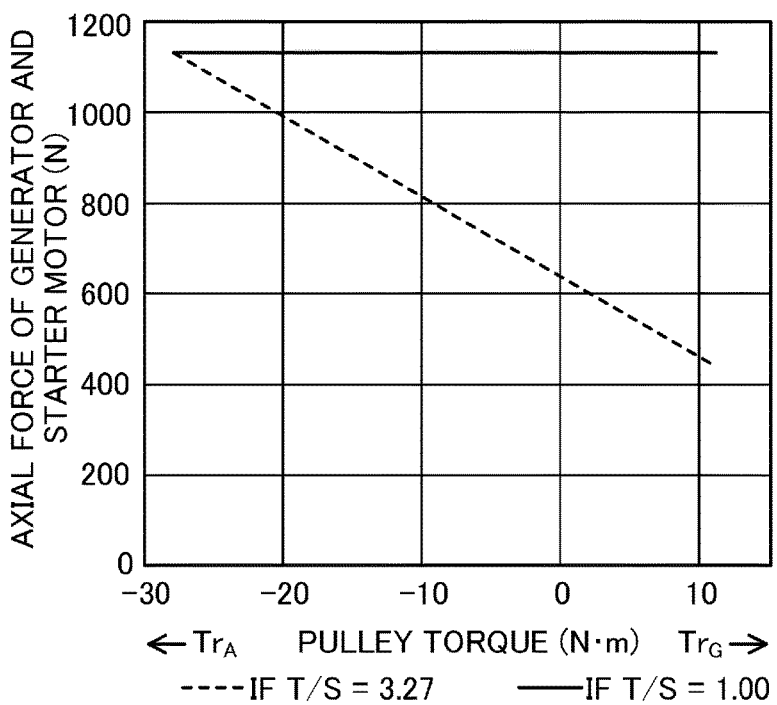
FIG. 10B shows, in the pulley 50, the relationship of the sum of tension forces occurring at the tension side of the belt and the slack side of the belt and the torque generated at the pulley 50.

Moreover, FIG. 10A shows simulation results of the relationship of the belt tension Tb1 between the pulley 50 and the second tension pulley 3 and the belt tension Tb2 between the pulley 50 and the first tension pulley 5 and the torque generated at the pulley 50, for a case where the T/S ratio is 1.00 and for a case where the T/S ratio is 3.27, respectively. FIG. 10B shows the relationship of the sum value of the tension side tension and the slack side tension of the belt at the pulley 50 and the torque generated at the pulley 50. FIGS. 8 and 9 and FIGS. 10A and 10B have different units regarding their longitudinal axes, but they show the same simulation results.

TABLE 2

| Layout | | | | | Required Tension N | | | | | | |
|---|---|---|---|---|---|---|---|---|---|---|---|
| Number of Belt Ribs | Pulley Diameter D | Wrap Angle $\theta$ | | | $Tr_{A=28\,N\cdot m}$ | | $Tr_{G=11\,N\cdot m}$ | | $\Delta Tbx = |TbxA - TbxG|$ | | T/S Ratio |
| | | | $Tr_A$ | $Tr_G$ | $Tb_{1A}$ | $Tb_{2A}$ | $Tb_{1G}$ | $Tb_{2G}$ | $\Delta Tb_1$ | $\Delta Tb_2$ | |
| 5 | 60 mm | 180 degrees | 28 N·m | 11 N·m | 102.8 | 1036.1 | 407.0 | 40.4 | 304.2 | 995.7 | 3.27 |

As shown in TABLE 2, in the this experiment, the number of belt ribs (i.e., belt width) was 5 (=17.8 mm), the pulley 50 had a diameter of 60 mm, and the belt wrap angle at the pulley 50 was 180 degrees. Having set the maximum value of a drive torque $Tr_A$ to 28 (N·m) and the maximum value of a driven torque $Tr_G$ to 11 (N·m), when $Tr_A$ was 28 (N·m), the required tension $Tb_{1A}$ of the belt 2 between the pulley 50 and the second tension pulley 3 became 102.8 (N·m) and the required tension $Tb_{2A}$ of the belt 2 between the pulley 50 and the first tension pulley 5 became 1036.1 (N·m).

Further, when $Tr_G$ was 11 (N·m), the required tension $Tb_{2G}$ of the belt 2 between the pulley 50 and the first tension pulley 5 became 40.4 (N·m), and the required tension $Tb_{1G}$ of the belt 2 between the pulley 50 and the second tension pulley 3 became 407.0 (N·m).

As a result, as shown in TABLE 2, $\Delta Tb_1$ became 304.2 (N·m), $\Delta Tb_2$ became 995.7 (N·m), and an appropriate T/S ration was calculated to be 3.27.

FIGS. 8 and 10A make clear that albeit the tension $Tb_1$ of the belt 2 between the pulley 50 and the second tension pulley 3 linearly increases while $Tr_A$ decreases and $Tr_G$ increases, by optimizing the T/S value, the tension $Tb_1$ can be reduced by a great extent within a required range as compared to a case where the T/S value is for example 1.00. Further, it becomes clear that albeit the tension $Tb_2$ of the belt 2 between the pulley 50 and the first tension pulley 5 linearly decreases while $Tr_A$ decreases and $Tr_G$ increases, by optimizing the T/S value, the tension $Tb_2$ can be reduced by a great extent within a required range as compared to a case where the T/S value is for example 1.00.

Further, FIGS. 9 and 10B make clear that when the T/S ratio is set to 1.00, a force acting on the axis of the pulley 50 (a sum of $Tb_1$ and $Tb_2$) is constant. However, when the T/S ratio is optimized, $Tr_A$ becomes smaller, and while $Tr_G$ becomes bigger, the force acting on the axis of pulley 50 decreases.

Accordingly, by setting the T/S ratio to a value at least bigger than 1.00, and more beneficially to a value close to the optimal value, the tension of the belt may be reduced to a necessary and sufficient range, by which the lifespan of the belt may be prolonged. Moreover, by reducing the force acting on an axis of a pulley, also the lifespan of the pulley may be prolonged.

Figure 11A:
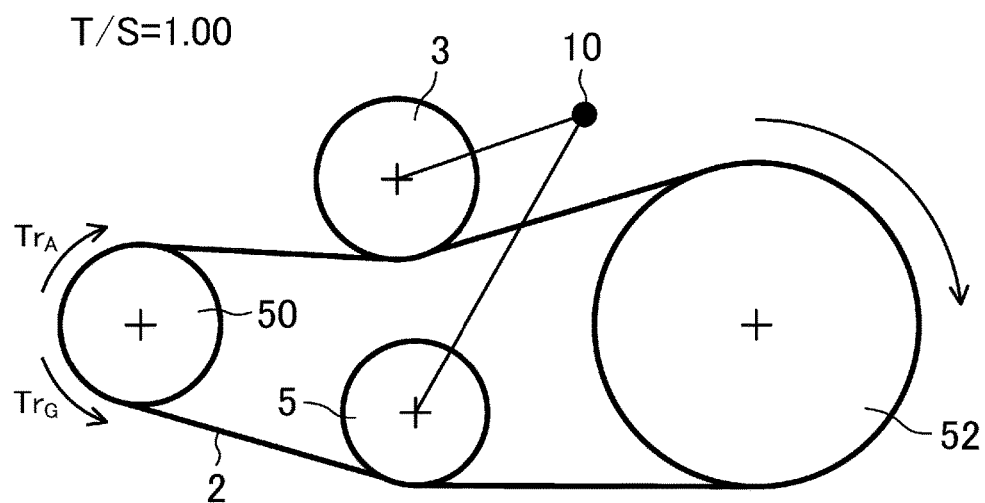
FIG. 11A shows, in a belt transmission system having the automatic tensioner according to the embodiment, a layout when the T/S ratio is set to 1.0.
Figure 11B:
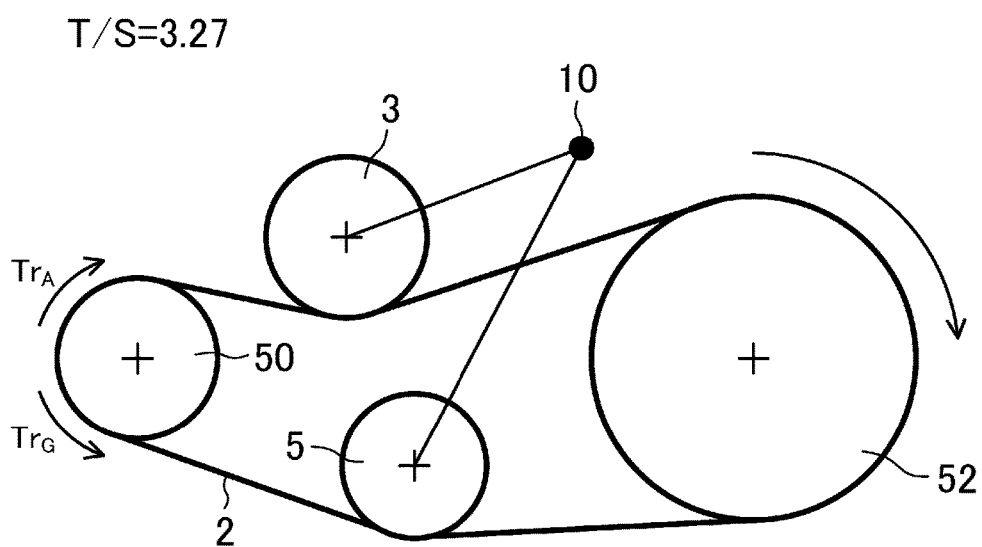
FIG. 11B shows, in a belt transmission system having the automatic tensioner according to the embodiment, a layout when the T/S ratio is set to 3.27.

FIGS. 11A and 11B show a layout example of a belt transmission system including the automatic tensioner 1 of the present embodiment where the T/S ratio is set to 1.00 and where the T/S ratio is set to 3.27. The belt transmission system shown in FIGS. 11A and 11B has the belt 2 wound between the pulley (driven pulley) 50 and a drive pulley 52, and is provided with the automatic tensioner 1.

The automatic tensioner shown in FIG. 11A and the automatic tensioner shown in FIG. 11B have a different belt wrap angle at the first tension pulley 5 and the second tension pulley 3, a different hub load angle, and a different arm length.

As shown in FIG. 10A, it was confirmed that by setting the T/S ratio to an optimized value of 3.27, as determined by the above calculation, under the condition that no torque was generated at the pulley 50 a tension decrease effect 55 of approximately 248 (N) was obtained as compared to the case where the T/S ratio was 1.00. It was also confirmed that if a driven torque $Tr_G$ of 11 (N) was generated at the pulley 50, a tension decrease effect 53 of approximately 346 (N) was obtained between the pulley 50 and the second tension pulley 3 as compared to the case where the T/S ratio was 1.00. Further, it was confirmed that by setting the T/S ratio to 3.27, in the case the drive torque $Tr_A$ was a maximum value as well as in the case the driven torque $Tr_G$ was a maximum value, the tension of the belt 2 was able to stay close to a lowest required tension 51 within a range a slippage region 57 was not entered.

Note that when designing the belt transmission system of the present embodiment, it is beneficial to optimize the T/S ratio to the greatest possible extent. If, however, the T/S ratio cannot be optimized due to, for instance, layout-related reasons, it is beneficial if, when a maximum torque is generated among the first tension pulley 5 and the second tension pulley 3, the torque of the tension pulley located at the slack side is set to be higher than the torque of the tension pulley located at the tension side. This may reduce excess tension applied to the belt.

By at least setting the T/S ratio to a value higher than 1, excess tension applied to the belt is reduced and it becomes possible to reduce axial stress acting on a pulley. Further, by setting the T/S ratio to a value higher than 1 and the ratio of the T/S ratio and the optimal value of the T/S ratio (=(T/S ratio)/(optimized value of T/S ratio)) to a value within a predetermined range, belt slippage and other trouble may be reduced effectively.

Figure 12:
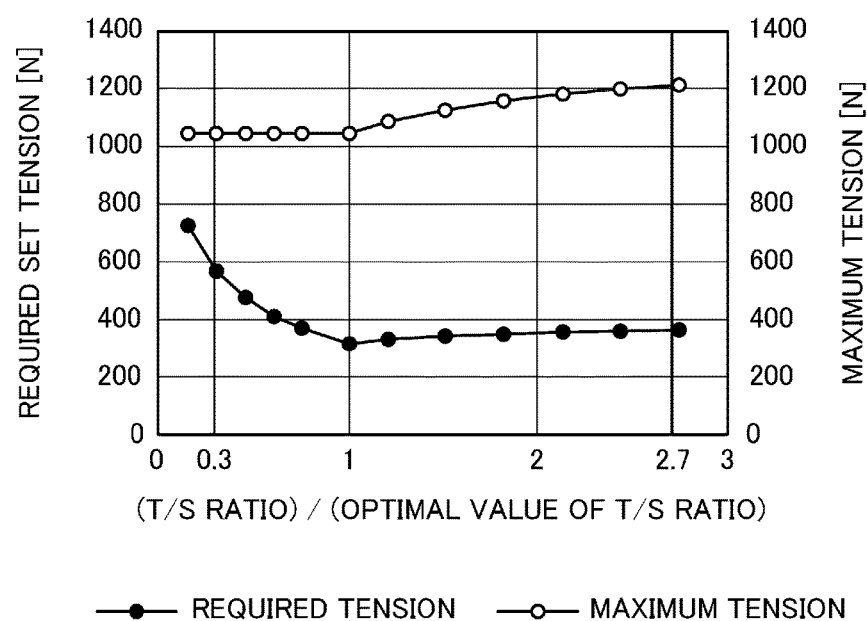
FIG. 12 shows the relationship of a ratio of the T/S ratio and an optimal value of the T/S ratio in a belt transmission system and a required tension and a maximum tension of the belt.
Figure 13A:
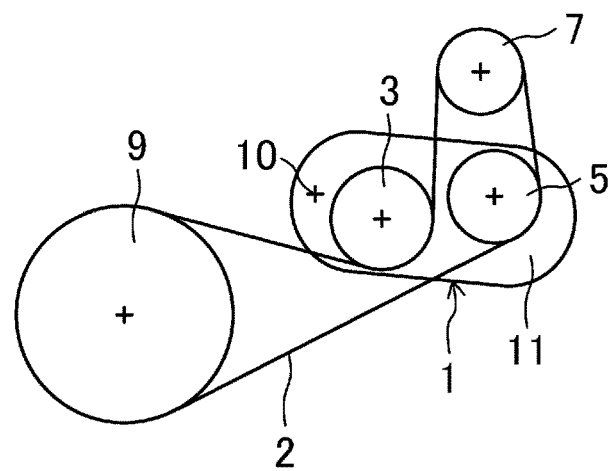
FIG. 13A shows a variation of a belt transmission system including the automatic tensioner of the present disclosure.
Figure 13B:
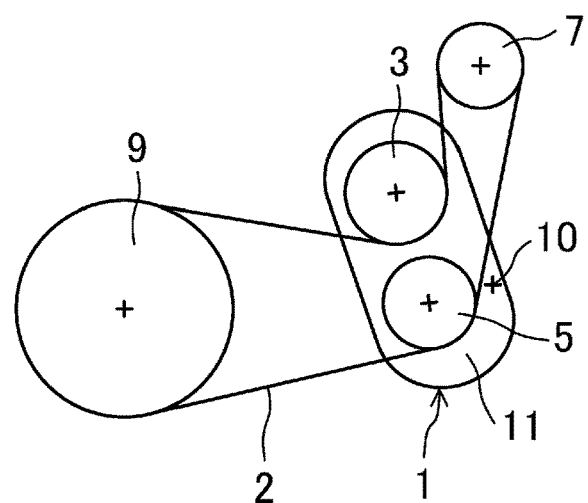
FIG. 13B shows a variation of the belt transmission system including the automatic tensioner of the present disclosure.
Figure 13C:
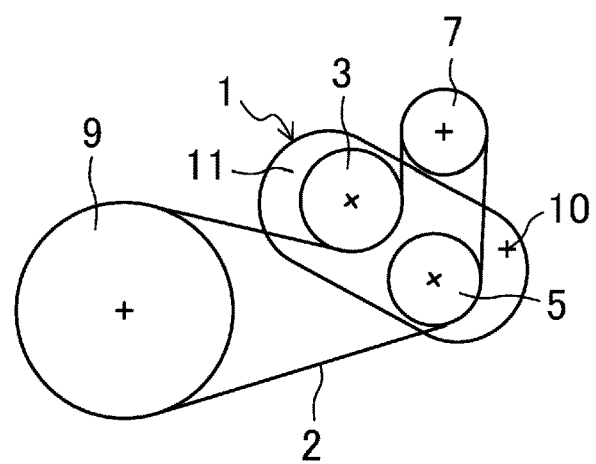
FIG. 13C shows a variation of the belt transmission system including the automatic tensioner of the present disclosure.

FIG. 12 shows the relationship of the ratio of the T/S ratio and the optimal value of the T/S ratio in a belt transmission system and the required tension and maximum tension of the belt. The same figure shows the results of altering the T/S ratio according to the same conditions as in FIGS. 10A and 10B.

The results shown in FIG. 12 make clear that it would be beneficial to set (T/S ratio)/(optimized value of T/S ratio) to a value in the range of 0.3 to 2.7.

If the value of (T/S ratio)/(optimized value of T/S ratio) falls below 0.3, the required tension with respect to the optimal value of the T/S ratio doubles or becomes even higher and the tension decrease effect decreases abruptly. Therefore, after having calculated the optimal value of the T/S ratio with the above-described method, it is beneficial to design the belt transmission system so that the value of (T/S ratio)/(optimized value of T/S ratio) is 0.3 or higher.

Conventionally, the number of ribs of the belt 2 used in a belt transmission system is 5 or 6. However, if the value of (T/S ratio)/(optimized value of T/S ratio) exceeds 2.7, the tension side tension of the belt 2 increases and the number of the ribs of the belt 2 needs to be increased. Therefore, it is beneficial to set the value of (T/S ratio)/(optimized value of T/S ratio) to 2.7 or lower.

Note that, in the above-described belt transmission system of the present embodiment, in the scope of an operation process, the strictest conditions prevail during a start-up time of a starter motor. Consequently, it is beneficial if the layout of the belt transmission system lives up to the conditions of the start-up time of the starter motor.

For example, in an initial state, it is beneficial if a torque applied on the second tension pulley 3 is higher than a torque applied on the first tension pulley 5. Further, to optimize the T/S ratio, it would also be beneficial to arrange a pulley closer to the oscillation center 10 of the arm 11 at the first tension pulley 5, and to arrange a pulley remote from the oscillation center 10 of the arm 11 as the second tension pulley 3.

The wrap angle of the belt 2 at the second tension pulley 3 may be bigger than the wrap angle of the belt 2 at the first tension pulley 5. When referring to the angle defined by an input line from the belt 2 to the tension pulley and a line connecting the oscillation center 10 of the arm 11 and the center of the tension pulley as a hub load angle (HLA; i.e., the above-described hub load angle α), the HLA at the first tension pulley 5 may deviate more from a 90-degree angle than the HLA at the second tension pulley 3.

Further, in the belt transmission system of the present embodiment, both in the case where the generator/starter pulley 7 is a drive pulley and the crankshaft pulley 9 is a driven pulley as well as in the case where the generator/starter pulley 7 is a driven pulley and the crankshaft pulley 9 is a drive pulley, the T/S ratio may be set so that the oscillation of the arm 11 is reduced. Therefore, compared to a belt transmission system of for instance US Patent Application Publication No. 2003/0153420 and Japanese Unexamined Patent Publication No. 2004-068973, in the belt transmission system of the present embodiment, the oscillation of the arm 11 may be reduced and durability may be improved.

In the example shown in FIG. 1, an inner surface of the belt 2 is wrapped around the first tension pulley 5, and an outer surface of the belt 2 is wrapped around the second tension pulley 3. However, the belt is not restricted to this kind of wrapping. For example, by adding an idler pulley in an appropriate way, the same surface of the belt may be wrapped around the first tension pulley 5 and the second tension pulley 3.

Also, in the belt transmission system of the present embodiment, a rotation direction 18 of the belt 2 goes clockwise. However, it may also go anticlockwise. Furthermore, the automatic tensioner 1 of the present embodiment may also be employed in a belt transmission system in which the rotation direction 18 of the belt 2 is changeable between a forward direction and a backward direction. Variations of the belt transmission system of the present embodiment will be summarized below.

—Variations of Belt Transmission System—

FIGS. 13A-C and FIGS. 14A-C show variations of a belt transmission system including the automatic tensioner of the present disclosure. In FIGS. 13 and 14, the center of the tubular portion (spindle) 16 of the fixed member 13 is aligned with the oscillation center 10 of the arm. In the example shown here, the belt 2 rotates clockwise when the engine starts up and is driven.

Figure 14A:
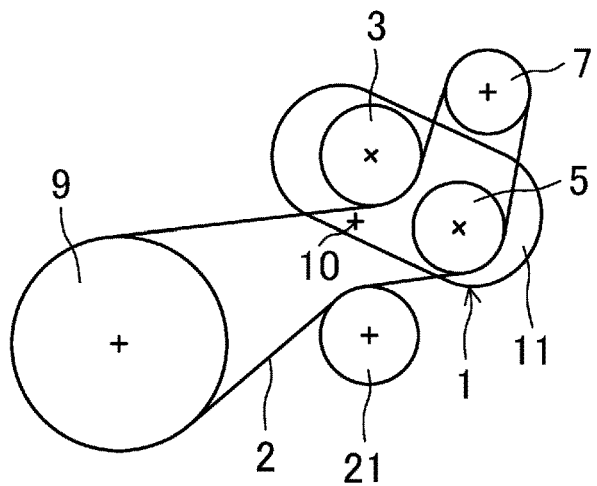
FIG. 14A shows a variation of the belt transmission system including the automatic tensioner of the present disclosure.
Figure 14B:
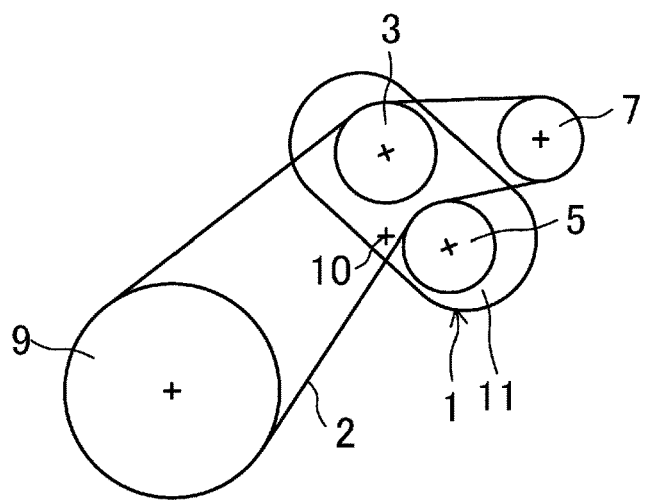
FIG. 14B shows a variation of the belt transmission system including the automatic tensioner of the present disclosure.
Figure 14C:
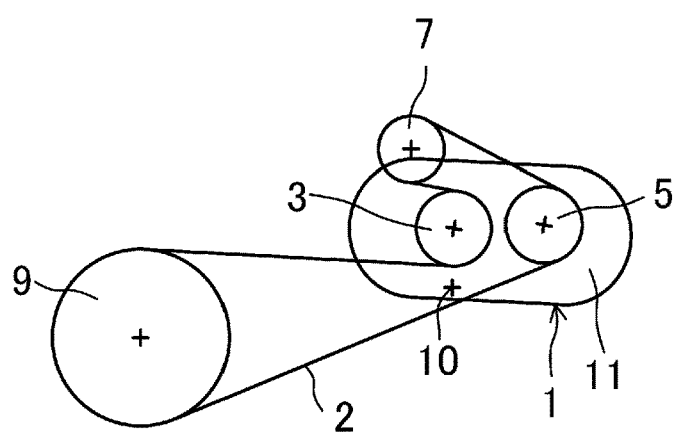
FIG. 14C shows a variation of the belt transmission system including the automatic tensioner of the present disclosure.

As shown in FIGS. 13A-C and FIGS. 14B and 14C, the wrap angle of the belt 2 at the first tension pulley 5 or the second tension pulley 3, and the arrangement of a pulley may be configured differently from the one in the example in FIG. 1. Further, as shown in FIG. 14A, another pulley may be added, such as an idler pulley 21 appropriate for a belt transmission system.

FIGS. 15A-C, FIGS. 16A and 16B, and FIGS. 17A and 17B show other variations of the belt transmission system including the automatic tensioner of the present disclosure.

Figure 15A:
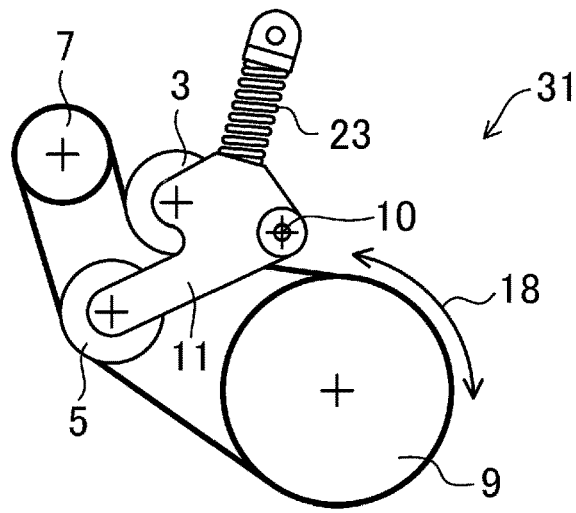
FIG. 15A shows a variation of the belt transmission system including the automatic tensioner of the present disclosure.
Figure 15B:
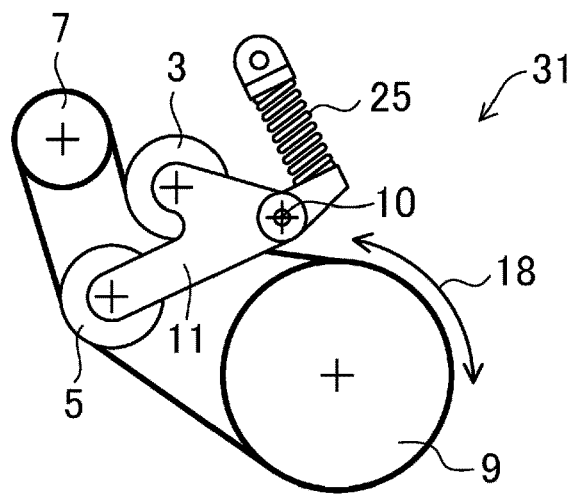
FIG. 15B shows a variation of the belt transmission system including the automatic tensioner of the present disclosure.
Figure 15C:
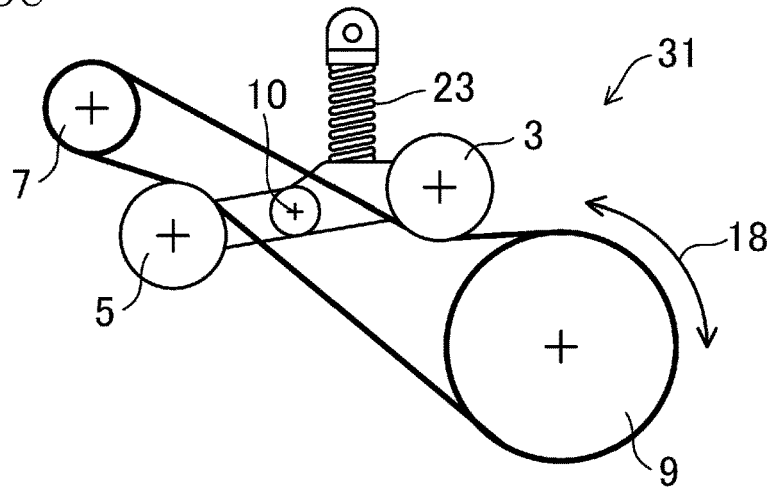
FIG. 15C shows a variation of the belt transmission system including the automatic tensioner of the present disclosure.

An automatic tensioner 31 shown in FIGS. 15A and 15C is provided with a compression spring 23 instead of the torsion coil spring 15, the compression spring 23 having one end fixed and the other end connected to the arm 11. An automatic tensioner 31 shown in FIG. 15B is provided with an extension spring 25 having one end fixed and the other end connected to the arm 11. In these automatic tensioners 31, the compression spring 23 and the extension spring 25 apply a driving force to the arm 11 when force from the belt 2 acts on the arm 11. Also in these belt transmission systems the rotation direction 18 of the belt 2 may be clockwise as in FIGS. 15A-C, but may as well be switchable to a forward or backward direction. A belt transmission system, in which the rotation direction of the belt 2 is switchable, is beneficially employed in, for instance, a plate compactor.

Further, as shown in FIG. 15C, the first tension pulley 5 and the second tension pulley 3 may both be in contact with an outer surface of the belt.

Figure 16A:
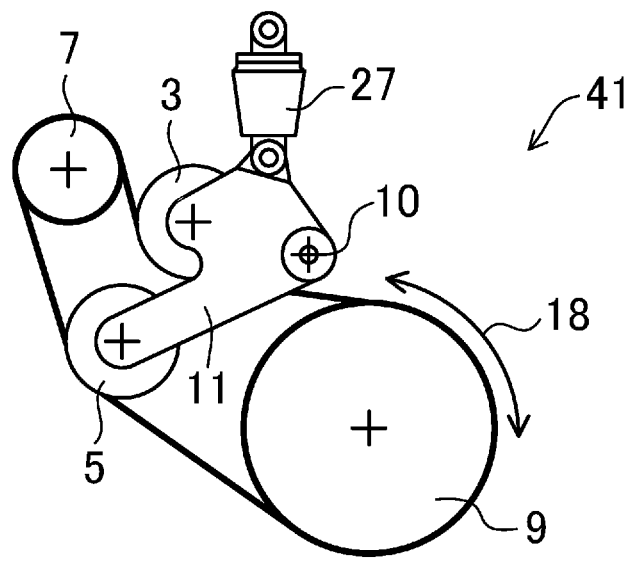
FIG. 16A shows a variation of the belt transmission system including the automatic tensioner of the present disclosure.

Also, a configuration may be employed like the one in an automatic tensioner 41 shown in FIG. 16A, where, in a hydraulic tensioner having a hydraulic damper 27 instead of the compression spring 23 shown in FIG. 15A, the first tension pulley 5 and the second tension pulley 3 are provided for the arm 11. The hydraulic damper 27 applies an appropriate opposing force to the arm 11 in accordance with the oscillation of the arm 11. The hydraulic damper 27 can apply a stronger force than a spring, which is why a hydraulic tensioner may be beneficially employed in applications with a comparatively high belt tension.

Figure 16B:
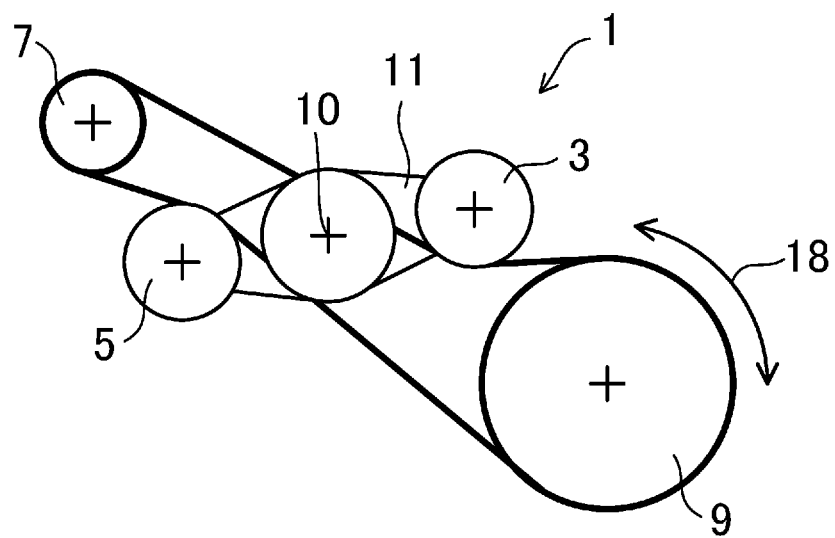
FIG. 16B shows a variation of the belt transmission system including the automatic tensioner of the present disclosure.

As shown in FIG. 16B, in the automatic tensioner 1 of the present embodiment shown in FIG. 1, the first tension pulley 5 and the second tension pulley 3 may be arranged at opposite sides of the oscillation center 10 of the arm 11 and have the oscillation center 10 between them. In this automatic tensioner 1, the first tension pulley 5 and the second tension pulley 3 are both in contact with an outer surface of the belt 2.

Figure 17A:
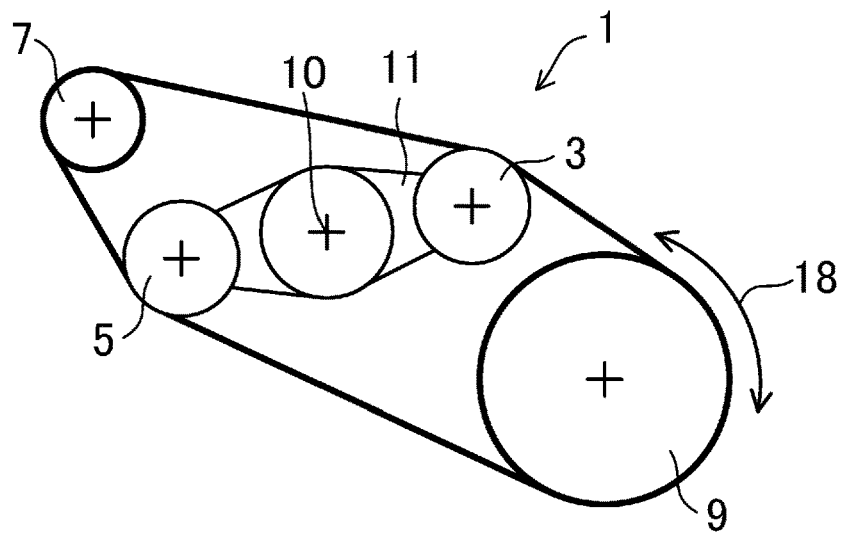
FIG. 17A shows a variation of the belt transmission system including the automatic tensioner of the present disclosure.
Figure 17B:
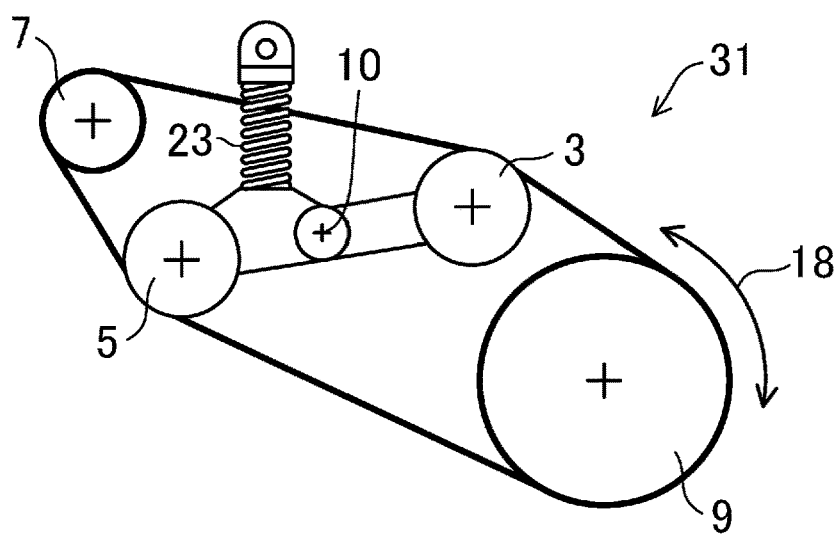
FIG. 17B shows a variation of the belt transmission system including the automatic tensioner of the present disclosure.

Further, as shown in FIG. 17B, even if the first tension pulley 5 and the second tension pulley 3 are both in contact with an inner surface of the belt 2, they can still apply a required tension to the belt 2.

Moreover, as shown in FIG. 17B, in the automatic tensioner 31 using a compression spring 23, the first tension pulley 5 and the second tension pulley 3 may both be in contact with the inner surface of the belt 2.

Note that, in each of the above-described variations, the first tension pulley 5 and the second tension pulley 3 rotate in the same direction. When the first tension pulley 5 rotates in a direction tensioning the belt 2, the second tension pulley 3 is configured to also rotate in a direction tensioning the belt 2.

An example of a belt transmission system has been explained above. However, changes and modifications may be appropriately made to the form, configuration, arrangement, components, size etc. of each member without departing from the scope of the present disclosure. For example, the belt transmission system does not need to have an internal combustion engine and a generator/starter motor. Tension pulleys, each being arranged between two drive pulleys, may be supported by a common arm, and may rotate in the same direction driven by force from the belt.

Further, in each of the variations of the belt transmission system shown in FIGS. 13-17, if the first tension pulley 5 rotates in a direction tensioning the belt 2, the second tension pulley 3 also rotates in a direction tensioning the belt 2. Contrariwise, if the first tension pulley 5 rotates in a direction slackening the belt 2, the second tension pulley 3 also rotates in a direction slackening the belt 2.

Therefore, like in the belt transmission system shown in FIG. 1, also in these variations, the oscillation of the arm 11 may be reduced both in the case where the crankshaft pulley 9 serves as a drive pulley and in the case where the generator/starter pulley 7 serves as a drive pulley. In the automatic tensioners of US Patent Application Publication No. 2003/0153420 and Japanese Unexamined Patent Publication No. 2004-068973, if one tension pulley rotates in a direction tensioning the belt, the other one rotates in a direction slackening the belt. In the variation of the belt transmission system shown for example in FIG. 16B, however, by employing the above layout, the oscillation of the arm may be reduced as compared to the conventional automatic tensioner mentioned above. Moreover, by employing a design taking into consideration the T/S ratio, a set tension may be reduced, fuel consumption may be enhanced, and the lifespan of the system may be prolonged.

Note that, in the above-described variations of the belt transmission system, when the belt rotation direction 18 is clockwise as in FIGS. 13-17, excess tension applied to a belt and force applied to an axis of a pulley may be reduced and the lifespan of the belt and the pulley may be prolonged by determining the optimal T/S ratio using the same method as the belt transmission system of the present embodiment and by designing an automatic tensioner having a T/S ratio higher than 1 and lower than or equal to the optimal value. However, in the above variations of the belt transmission system, in a case where the belt rotation direction 18 is switchable between a forward and a backward direction, if the T/S ratio is set to a value higher than 1, tension becomes high when the belt rotates in a backward direction. Therefore, the T/S ratio does not necessarily have to be higher than 1.

The automatic tensioner according to an example of the present disclosure, may be applied, for instance, in various kinds of vehicles having an internal combustion engine.

What is claimed is:

1. A belt transmission system comprising:
a first pulley transmitting a first power;
a second pulley transmitting a second power;
an endless belt wrapped between the first pulley and the second pulley; and
an automatic tensioner including a first tension pulley applying tension to a portion of the endless belt located between the first pulley and the second pulley on a slack side of the first pulley during normal operation, a second tension pulley applying tension to a portion of the endless belt located between the first pulley and the second pulley on a tension side of the first pulley during normal operation, a fixing member, and an arm provided on the fixed member in a manner capable of oscillating in an axial rotation direction of the fixed member,
wherein
the first tension pulley and the second tension pulley both are supported on the arm, force from the endless belt makes the first tension pulley and the second tension pulley rotate in the same direction, and
when the first tension pulley rotates in a direction tensioning the endless belt, the second tension pulley also rotates in the direction tensioning the endless belt, and
a T/S ratio determined by the equation $$\{L1 \times \sin(\theta 1/2) \times \sin(\alpha 1)\}/\{L2 \times \sin(\theta 2/2) \times \sin(\alpha 2)\}$$

is bigger than 1, where a first arm length from a pivotal center of the arm to a center of the second tension pulley is L1, a belt wrap angle at the second tension pulley is θ1, and a hub load angle at the second tension pulley is α1, and where a second arm length from a pivotal center of the arm to a center of the first tension pulley is L2, a belt wrap angle at the first tension pulley is θ2, and a hub load angle at the first tension pulley is α2.

2. The belt transmission system of claim 1, wherein
a spring applying tension to the endless belt is connected to the arm via the first tension pulley and the second tension pulley.

3. The belt transmission system of claim 2, wherein
the spring is a torsion coil spring having one end connected to the arm and the other end connected to the fixed member, and driving the arm in an oscillation direction of the arm.

4. The belt transmission system of claim 1, wherein
the spring is a compression spring or an extension spring having one end fixed and the other end connected to the arm.

5. The belt transmission system of claim 1, wherein
the first tension pulley is in contact with an outer surface or an inner surface of the endless belt, and
the second tension pulley and the first tension pulley are in contact with the same one among the outer surface or the inner surface of the endless belt.

6. The belt transmission system of claim 1, wherein
the first pulley is a crankshaft pulley transmitting power generated at an internal combustion engine, and
the second pulley is a generator/starter pulley transmitting power generated at a generator/starter motor.

7. The belt transmission system of claim 6, wherein
in an initial state, a torque applied to the second tension pulley is higher than a torque applied to the first tension pulley.

8. The belt transmission system of claim 1, wherein a rotation direction of the endless belt is changeable between a forward direction and a backward direction.

9. A belt transmission system of claim 1, comprising:
a first pulley transmitting a first power;
a second pulley transmitting a second power;
an endless belt wrapped between the first pulley and the second pulley; and
an automatic tensioner including a first tension pulley applying tension to a portion of the endless belt located between the first pulley and the second pulley on a slack side of the first pulley during normal operation, a second tension pulley applying tension to a portion of the endless belt located between the first pulley and the second pulley on a tension side of the first pulley during normal operation, a fixing member, and an arm provided on the fixed member in a manner capable of oscillating in an axial rotation direction of the fixed member,
wherein
the first tension pulley and the second tension pulley both are supported on the arm, force from the endless belt makes the first tension pulley and the second tension pulley rotate in the same direction, and
when the first tension pulley rotates in a direction tensioning the endless belt, the second tension pulley also rotates in the direction tensioning the endless belt, and
the first tension pulley is in contact with an outer surface or an inner surface of the endless belt, and
the second tension pulley is in contact with one of the outer surface or the inner surface of the endless belt, and the first tension pulley is in contact with the other one of the outer surface or the inner surface of the endless belt.

10. A belt transmission system, comprising:
a first pulley transmitting a first power;
a second pulley transmitting a second power;
an endless belt wrapped between the first pulley and the second pulley; and
an automatic tensioner including a first tension pulley applying tension to a portion of the endless belt located between the first pulley and the second pulley on a slack side of the first pulley during normal operation, a second tension pulley applying tension to a portion of the endless belt located between the first pulley and the second pulley on a tension side of the first pulley during normal operation, a fixing member, and an arm provided on the fixed member in a manner capable of oscillating in an axial rotation direction of the fixed member,
wherein
the first tension pulley and the second tension pulley both are supported on the arm, force from the endless belt makes the first tension pulley and the second tension pulley rotate in the same direction, and
when the first tension pulley rotates in a direction tensioning the endless belt, the second tension pulley also rotates in the direction tensioning the endless belt, and
the first tension pulley, in comparison to the second tension pulley, is closer to an oscillation center of the arm.

* * * * *

UNITED STATES PATENT AND TRADEMARK OFFICE
CERTIFICATE OF CORRECTION

PATENT NO. : 10,295,025 B2
APPLICATION NO. : 15/357792
DATED : May 21, 2019
INVENTOR(S) : Keisuke Takenaka Page 1 of 1

It is certified that error appears in the above-identified patent and that said Letters Patent is hereby corrected as shown below:

In the Claims

Column 15, Line 51, in Claim 4, change "system of claim 1" to --system of claim 2--.

Signed and Sealed this
Nineteenth Day of May, 2020

Andrei Iancu
*Director of the United States Patent and Trademark Office*